United States Patent [19]

Bennett et al.

[11] 3,924,412

[45] Dec. 9, 1975

[54] OIL CONTAINMENT BOOM

[75] Inventors: John A. Bennett, West Vancouver; Ian R. McAllister, Vancouver, both of Canada

[73] Assignee: Bennett Pollution Controls, Ltd., North Vancouver, Canada

[22] Filed: Mar. 3, 1975

[21] Appl. No.: 554,979

Related U.S. Application Data

[63] Continuation-in-part of Ser. No. 541,260, Jan. 15, 1975, which is a continuation of Ser. No. 464,539, April 26, 1974, abandoned.

[52] U.S. Cl. .................................................. 61/1 F
[51] Int. Cl.² ......................................... E02B 15/04
[58] Field of Search.... 61/1 F, 5; 210/242, DIG. 21; 114/.5 T, 122; 43/44.9

[56] References Cited
UNITED STATES PATENTS

| | | | |
|---|---|---|---|
| 3,713,410 | 1/1973 | Ducrocq et al. | 61/1 F |
| 3,786,637 | 1/1974 | Muramatsu et al. | 61/1 F |
| 3,792,589 | 2/1974 | Sayles | 61/1 F |

*Primary Examiner*—Paul R. Gilliam
*Assistant Examiner*—Alex Grosz
*Attorney, Agent, or Firm*—Graybeal, Barnard, Uhlir & Hughes

[57] ABSTRACT

A floating oil containment boom especially adapted to remain continuously in the body of water in which it operates. The boom comprises an elongate, moderately flexible skirt, having an upper edge above the water surface and a lower weighted edge positioned below the water surface. Pairs of floats are mounted to the skirt at regularly spaced intervals along the length of the skirt. In a first embodiment, each float is mounted to the skirt by means of a tongue and groove connecting device, made up of a longitudinal groove in the float and two tongue members connected to the skirt and positioned at opposite ends of the groove of the related float. In a second embodiment the tongue and groove connection is made by a plurality of clips mounted to the skirt and defining a groove to receive upper and lower flanges of the float. Such tongue and groove mountings permit moderate relative longitudinal movement between the connecting portions of the skirt and float so that when the skirt is subjected to moderate elongation under tension loads, there is not undue wear of the connecting portions.

12 Claims, 7 Drawing Figures

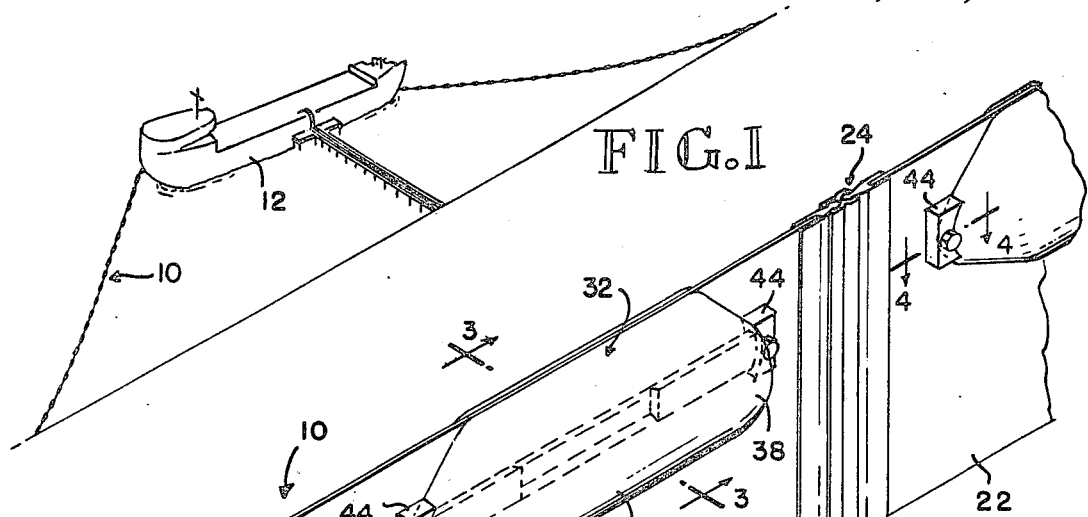
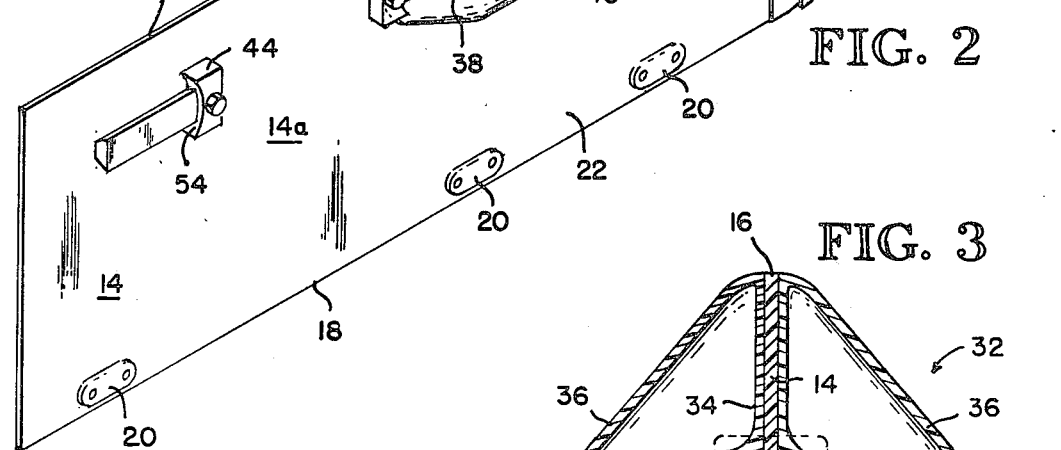
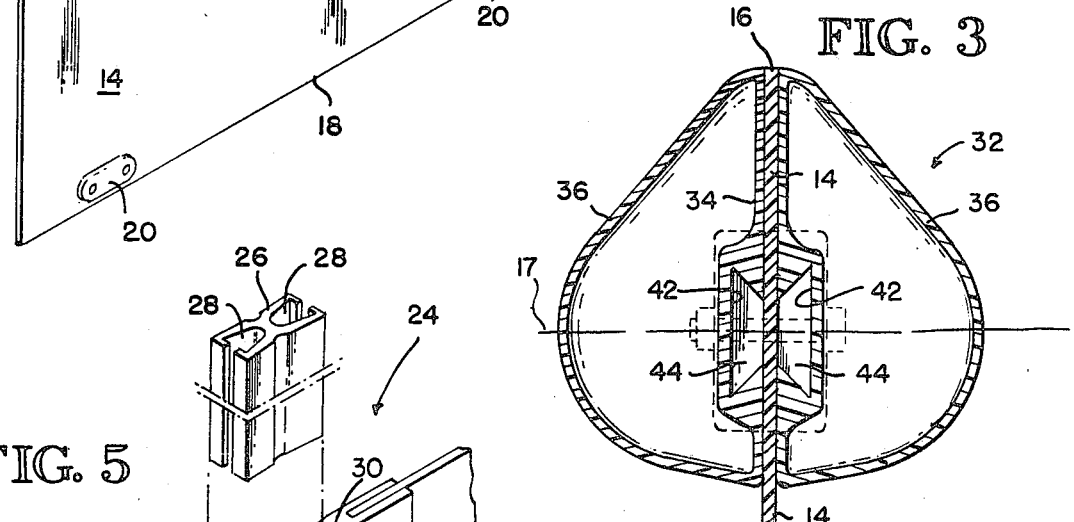
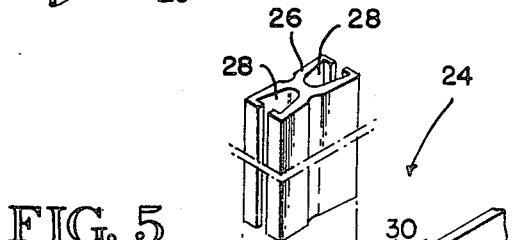
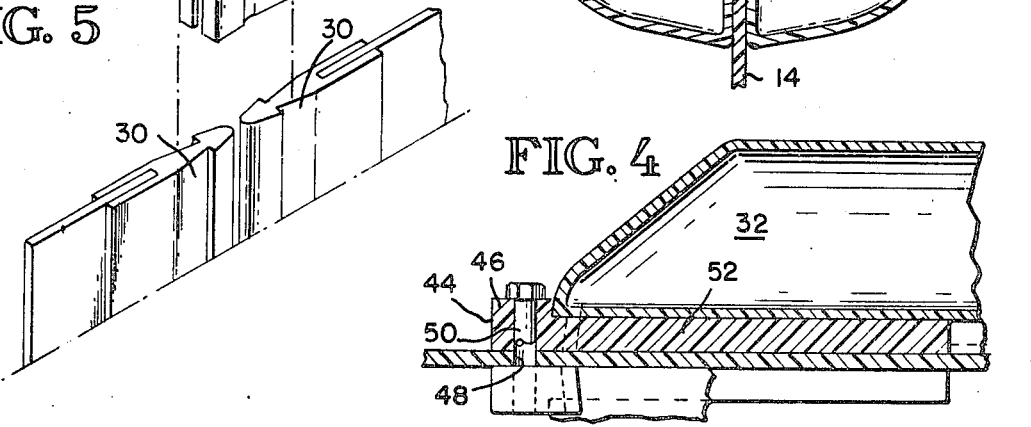

OIL CONTAINMENT BOOM

CROSS REFERENCE TO RELATED APPLICATIONS

This is a continuation-in-part application to my pending U.S. Pat. application, entitled OIL CONTAINMENT BOOM, Ser. No. 541,260, filed Jan. 15, 1975, which application is a streamlined continuation of my earlier U.S. Pat. application, entitled OIL CONTAINMENT BOOM, Ser. No. 464,539, filed Apr. 26, 1974, now abandoned.

BACKGROUND OF THE INVENTION

1. Field of the Invention

The present invention relates to floating oil containment booms, such as those used in harbors and the like to contain the oil resulting from accidental spills.

2. Description of the Prior Art

One of the problem areas in providing containment booms for oil spills is that if the boom is made too rigid, it is not able to conform sufficiently to the contours of the waves in the water to prevent passage of oil either over submerged sections of the boom or underneath sections of the boom that are suspended in the air temporarily. Thus, there are booms that provide for sufficient movement between the relative parts of the boom so that the boom is better able to conform to the contours of the waves.

One type of prior art boom comprises an elongate vertically disposed skirt having floats strapped to the skirt at regular intervals along the length thereof. One or more longitudinal cables are provided to withstand the tension loads to which the boom is subjected, while permitting the skirt material to flex sufficiently so that the boom can conform to the wave contours. In yet another configuration, a plurality of floats are mounted to struts which in turn are rigidly connected at right angles to the skirt by fasteners, with the floats projecting outwardly from the two surfaces of the skirt. One of the problems with these prior art booms is their inability to withstand the wear and tear to which they are subjected when they remain in the water for any prolonged period.

As other examples of the prior art, U.S. Pat. No. 3,786,637 illustrates a boom configuration wherein there is a flexible skirt having a pair of flexible inflatable members on opposite sides of the skirt. Each inflatable member is fixedly connected to the skirt at regularly spaced intervals along its length by means of connecting straps attached to the skirt and adhesively bonded to the inflatable members.

U.S. Pat. No. 3,792,589 illustrates yet another boom configuration wherein the skirt is made of two layers bonded one to another, with the upper portions of the two layers forming an inflatable chamber. Thus, the inflatable member is in effect made integral with the skirt itself. A tension cable is provided to withstand the stresses imposed on the boom.

U.S. Pat. No. 3,713,410 discloses yet another boom configuration wherein there is a skirt or barrier made up of overlapping sections. There are a number of flexible floats, each of which is attached to a plurality of these barrier sections, with each end of each float fixedly connected to a respective barrier section. At the bottom of the barrier sections there is a chain which acts as a connecting means for the several sections and also serves the role of ballast and traction means.

Because of safety considerations regarding off-loading of oil from marine vessels, there is an urgent requirement that vessels be surrounded with an oil containment boom whenever transfer of oil is taking place. With the frequency that the transfer of oil from marine vessels occurs at most terminals, as a practical matter it becomes a necessity to leave the containment booms in the water at all times. Thus, the boom is continuously subjected to wave action, wear and tear due to contact against ships, piers, etc., and by other attack of the environmental elements.

In view of the foregoing, it is an object of the present invention to provide an oil containment boom especially adapted for use in a manner that the boom can remain continuously in the water for a relatively long time.

SUMMARY OF THE INVENTION

In the present invention, there is an elongate generally planar skirt made of a moderately flexible material, and adapted to be positioned in the water with an upper lateral edge of the skirt above the water surface and a lower lateral edge beneath the water surface. The skirt is of sufficient strength, and is so arranged, that it is a primary load carrying member with respect to tension loads along the length of the boom. Pairs of floats are connected to the skirt at regularly spaced intervals, with the two floats of each pair being positioned adjacent one another on opposite sides of the skirt.

The needed flexibility of the boom is provided by the skirt portion between adjacent pairs of floats. Each float has a flat mounting surface which fits against a surface of the skirt. There is a tongue and groove interconnection between each float and the skirt, with the longitudinal axis of the tongue and groove connection being longitudinally aligned, so that moderate elongation of the skirt due to tension loading on the skirt permits a limited amount of relative longitudinal movement at the area of interconnection between the float and skirt, so that there are no severe stresses on the connecting parts which would otherwise cause failure. Stop means are provided to limit the relative longitudinal movement of the floats with respect to the skirt.

In a first embodiment of the invention, there is for each float a longitudinal groove extending the length of the float at the float's flat surface which adjoins the skirt. There are two tongue members positioned at opposite ends of their related float, with each tongue member having a head portion by which it is fastened to the skirt and tongue portion interfitting with the groove in the float. In addition, the head portion acts as a stop to prevent the float from sliding out of its connection.

In a second embodiment of the invention, there is for each float connecting means attached to the skirt and defining a longitudinal groove to engage laterally extending tongue or flange portions of the float. Stop means are provided by fixedly connecting each float to the skirt at a single longitudinal location along the length of the float so that elongation of the skirt relative to the float on either side of the connecting location is permitted.

Other features of the invention will become apparent from the following detailed description.

BRIEF DESCRIPTION OF THE DRAWINGS

FIG. 1 is an isometric view illustrating the boom of the present invention in place and surrounding a ship adjacent a shore intallation;

FIG. 2 is an isometric view of a portion of a first embodiment of the boom of the present invention;

FIG. 3 is a transverse sectional view taken along line 3—3 of FIG. 2;

FIG. 4 is a longitudinal sectional view taken along line 4—4 of FIG. 2;

FIG. 5 is an isometric view illustrating a portion of the connecting means between adjacent skirt sections of the boom of the present invention;

DESCRIPTION OF THE PREFERRED EMBODIMENT

Figure 6:
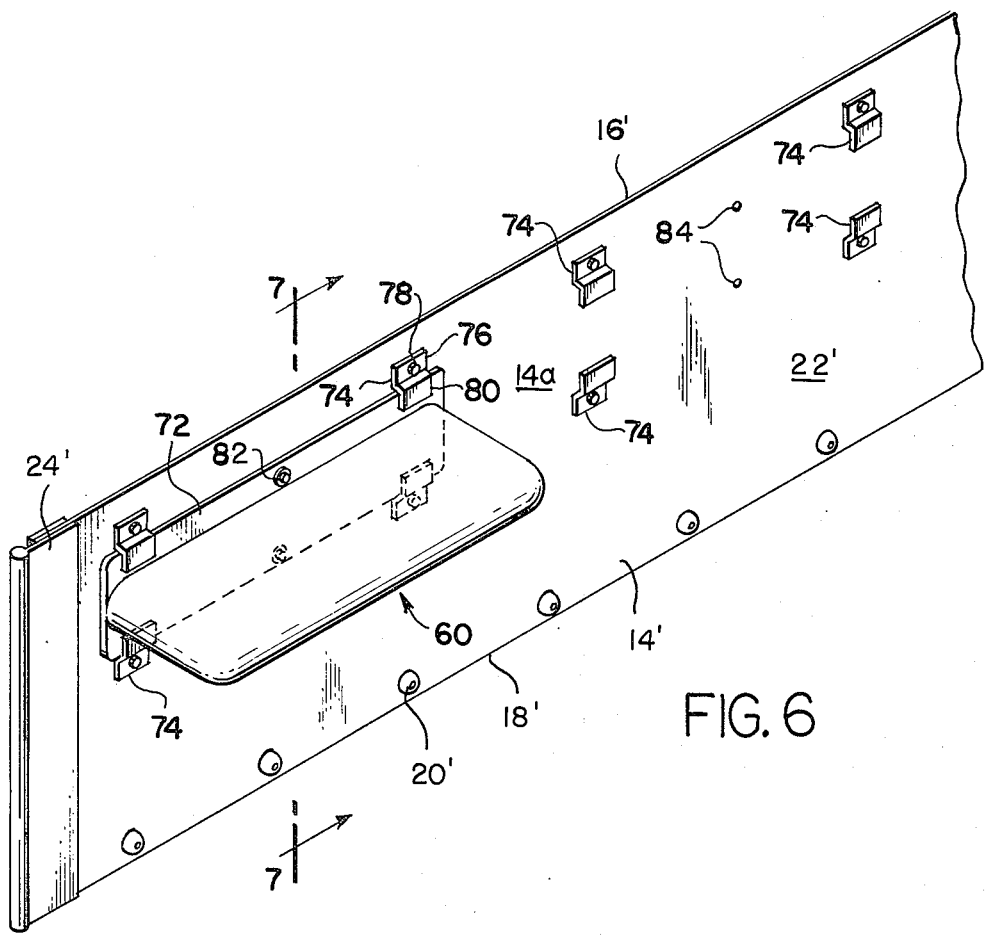
FIG. 6 is an isometric view, similar to FIG. 2, of a portion of a second embodiment of the boom of the present invention.

As shown in FIG. 1, there is a boom 10 positioned in a body of water surrounding a vessel 12 that is adjacent a shore installation. A first embodiment of this boom 10 is shown in FIGS. 2 through 4. This boom 10 comprises an elongate skirt 14 having an upper lateral edge 16 located a moderate distance above the water surface 17, and a lower lateral edge 18 positioned below the water surface, so that the longitudinal axis of the skirt 14 is generally parallel to the water surface 17. At intervals along the lower edge 18 of the skirt 14, there are provided a number of weights 20, which maintain the plane of the skirt 14 in a vertical position in the water.

As illustrated herein, the skirt 14 is composed of a plurality of flat rectangular elongate sections 22 joined by suitable end edge connections 24. Each end edge connection 24 comprises a connector 26 having a pair of opposite vertical slots 28 adapted to engage adjacent end members 30 of two adjacent skirt sections 22. The main skirt section 22 is desirably made of a plastic material having a moderate degree of flexibility. A suitable material for this use is a single ply urethane belting with a polyester carcass. The thickness of the material making up the skirt section is sufficient to withstand the main tension loads to which the boom is subjected when in use, yet is not so thick as to limit the desired flexibility of the skirt 14 in response to wave action. In practice, the thickness of the skirt material can be between about ⅛ to 5/16 inches.

At regularly spaced intervals adjacent the upper edge portion 16 of the skirt 14, there are mounted pairs of floats 32. Each float 32 is hollow and has a flat inner wall portion 34 adapted to fit against the skirt 14, and an outer or exposed wall portion 36. The outer wall portion 36 is generally rounded, having two tapered end portions 38 and a middle portion 40 rounded in a vertical plane. The end portion and middle portion thus taper in a narrowing direction from the plane of the skirt 14. The float 32 is so shaped that the enclosed buoyant volume is larger at the bottom to provide the maximum area of buoyancy at the water line 17. Each pair of floats 32 is positioned with the floats 32 being on opposite sides of the skirt 14, so that the two floats 32 collectively have an overall oblong tapered configuration with respect to the longitudinal axis of the skirt. Desirably, each float is made by a rotary molding process from a cross linked polyethylene. This is to provide maximum protection against deterioration due to ultraviolet attack, corrosion, impact resistance, abrasion resistance, etc.

Each float 32 is mounted to the skirt through a tongue and groove connection. In the particular arrangement shown herein, this connection comprises a longitudinally extending groove 42 formed in the flat inner side wall 34 of the float 32. There are two tongue members 44 mounted to the skirt 14 at opposite ends of its related float 32.

Each tongue member 44 comprises a head portion 46 having a through hole 48 by which the tongue member 44 can be attached to the skirt 14 by means of a related joining pin 50, with the pin 50 extending through the skirt 14 and securing adjacent pairs of tongue members on opposite sides of the skirt 14. Connected to the head portion 46 is a tongue portion 52 having a cross sectional configuration matching that of the float groove 42 in which it is mounted. As shown herein, this cross sectional configuration of both the tongue 52 and the groove 42 is that of a trapezoid. However, it is readily apparent to those skilled in the art that other configurations could also be used, the essential feature being that the tongue and groove interfit be such as to prevent the float 32 and skirt 14 from being separated from one another laterally, while permitting limited relative motion parallel to the longitudinal axis of the tongue and groove interfit. The head portion 46 of each tongue member 44 has an inwardly facing shoulder 54 to engage an end face of the float 32.

In operation, with the boom 10 placed in the water, the floats 32 cause the boom 10 to remain adjacent the water surface 17, with the plane of the skirt 14 being vertically oriented, due to the ballast provided by the weights 20. The ends of the boom are secured in a conventional manner and the skirt 14 withstands the tension loading to which the boom 10 is subjected during use. In the event that the boom 10 is subjected to wave action from the water, the skirt portions 14a between adjacent pairs of floats 32 bend about an axis generally parallel to the plane of the skirt 14. This bending action, along with moderate tilting of the plane of the skirt 14 at various portions thereof due to the wave action, permits portions of the boom to deflect upwardly and downwardly to generally follow the contour of the waves. However, there is no significant relative movement between adjoining component parts of the boom, with the floats 32 and skirt 14 remaining substantially fixed to one another.

At the actual area of interconnection, there is permitted limited lateral movement of the interconnecting portions in a longitudinal direction. Thus, when the skirt 14 is subjected to tension loading, so as to cause moderate elongation of the skirt 14, there is no undue stress placed upon the interconnecting parts, since the tongue portion 52 of the member 44 can slip in its groove 42.

While the boom of the present invention is especially adapted to remain continuously in the water, it can be readily appreciated that this boom can easily be assembled and disassembled. The floats 32 can be connected or disconnected from the skirt 14 simply by removing the joining pins 50. Also the skirt 14 can be rolled up for storage.

Figure 7:
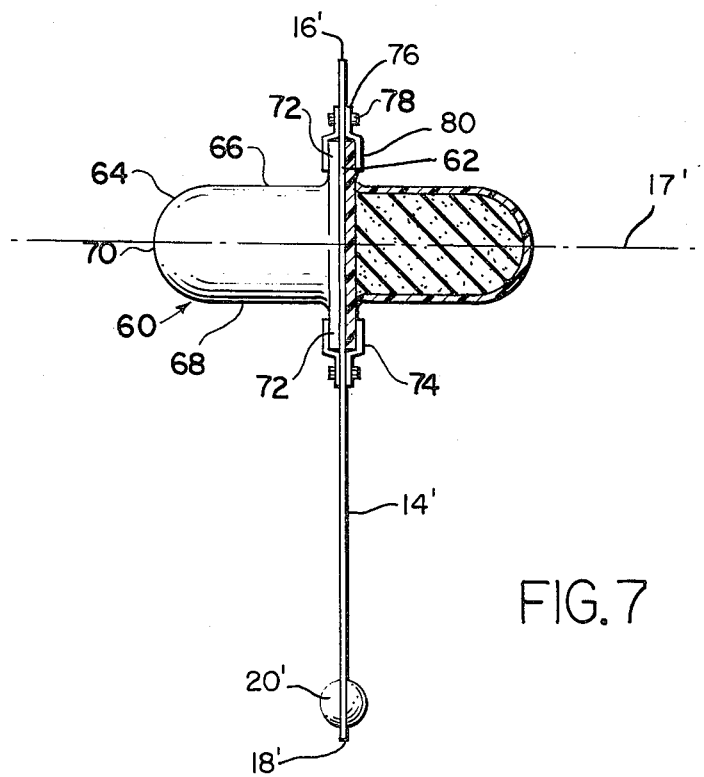
FIG. 7 is a sectional view taken along line 7—7 of FIG. 6.

The second embodiment of the present invention is shown in FIGS. 6 and 7. In this second embodiment there is a skirt 14' having an upper lateral edge 16' located above the water surface 17', and a lower lateral edge 18' positioned below the water surface, so that the longitudinal axis of the skirt 14' is generally parallel to the water surface 17'. At intervals along the lower edge 18' of the skirt 14', there are provided a number of weights 20', which maintain the plane of the skirt 14' in a vertical position in the water.

As in the first embodiment, the skirt 14' is composed of a plurality of flat, rectangular, moderately flexible, elongate sections 22' joined by suitable end edge connecting portions, indicated at 24'. At regularly spaced intervals adjacent the upper edge portion 16' of the skirt 14', there are mounted pairs of floats 60. Each float 60 is hollow and has a flat inner wall portion 62 adapted to fit against the skirt 14', and an outer or exposed wall portion 64. This exposed wall portion 64 is made up of upper and lower planar generally horizontal sections 66 and 68, respectively, joined one to another by a lateral rounded peripheral portion 70. The horizontal lateral dimension of each float 60 is moderately greater than its height dimension, so that with each pair of floats 60 being positioned with the two floats 60 on opposite sides of the skirt 14', the floats 60 provide adequately lateral stability for the skirt 14'.

The flat inner wall portion 62 of each float 60 extends both upwardly and downwardly a moderate distance beyond the exposed wall portion 64 to form upper and lower flanges 72. Engaging the opposite end portions of the upper flange portion 72 are two retaining clips 74, and a second pair of retaining clips 74 engage the opposite end portions of the lower flange member 72. Each clip 72 has a flat connecting portion 76 located adjacent its related flange 72 and bolted at 78 to the skirt 14'. The clip member 74 also has a retaining or overlapping portion 80 integral with the connecting portion 76 and extending over its related flange 72. Thus, as can be seen in FIG. 6, the float 60 has upper and lower clips 74 at each end portion thereof securing the end portions of the float 60 against the skirt 14'. These clips 74 with the flanges 72 collectively define a longitudinally extending tongue and groove connection which permits relative longitudinal movement between the interengaging components (i.e. the clips 74 and flanges 72).

To maintain proper location of the float 60 on the skirt 14', each flange 72 has at the center thereof a stop means in the form of a positive connection to the skirt 14'. This is conveniently accomplished by simply inserting a stop bolt 82 through a hole in each flange 72 of each float 60, through a matching hole 84 in the skirt 14', and through another matching hole in a flange 72 of a float 60 positioned on the opposite side of the skirt 14'. With the upper and lower stop bolts 82 of each float 60 being at the same location longitudinally, elongation of the skirt 14' relative to each float 60 is permitted.

The operation of the boom 10' of the second embodiment is substantially the same as in the first embodiment. With the boom 10' placed in the water, the floats 60 cause the boom 10' to remain adjacent the water surface 17', with the plane of the skirt 14' being vertically oriented, due to the ballast provided by the weights 20'. The skirt portions 14a' between adjacent pairs of floats 60 react with the wave action substantially in the manner described with reference to the first embodiment. At the area of interconnection between the clips 74 and the float flanges 72, there is permitted limited relative lateral movement in a longitudinal direction. Thus, when the skirt 14 is subjected to tension loading, so as to cause moderate elongation of the skirt 14', there is no undue stress placed upon the connecting clips 72. The stop bolts 82 serve essentially as locating members to limit longitudinal movement of the floats 60 with respect to adjacent portions of the skirt 14'.

As in the first embodiment, while the boom of the present invention is especially adapted to remain continuously in the water, it can readily be appreciated that this boom can easily be assembled and disassembled. For assembly, the floats 60 are slipped between sets of clips 72, and secured in place by inserting the stop bolts 84. In addition, the stop bolts can be easily removed to permit the floats 60 to be slipped away from the clips 74, so that the skirt 14' can be rolled up for storage.

What is claimed is:

1. A containment boom comprising:
   a. an elongate, generally planar, flexible skirt adapted to be positioned in a body of water at the surface thereof with a longitudinal axis of the skirt being generally parallel to the water surface, and with an upper lateral edge of the skirt being above the water surface and a lower lateral edge of the skirt being below the water surface, said skirt having sufficient strength and being arranged to be a primary load carrying member with respect to tensile forces along the length of the boom, with said skirt thus being subjected to moderate elongation under tensile loading;
   b. a plurality of floats adapted to be mounted to said skirt at spaced intervals along the length of the skirt, each of said floats having an outer exposed surface and a generally flat inner mounting surface adapted to fit against a surface of said skirt;
   c. a plurality of connecting means for said floats to connect the floats to the skirt, each of said connecting means comprising a tongue and groove interconnection between its related float and said skirt, said tongue and groove interconnection having a longitudinal engaging axis permitting limited movement along said axis between connecting portions of the skirt and float, whereby moderate elongation of said skirt does not cause substantial stress at the area of the connection between the float and the skirt, and
   d. stop means arranged to engage said floats so as to limit longitudinal movement thereof relative to the skirt and thus maintain the floats in proper position.

2. The boom as recited in claim 1, wherein each of said floats is provided with a longitudinal groove at the inner mounting surface thereof, and tongue means mounted to said skirt and generally longitudinally aligned therewith, with said tongue means interfitting with said groove in connecting relationship.

3. The boom as recited in claim 2, wherein said stop means comprises end stop means arranged to engage its related float and limit longitudinal movement thereof relative to the skirt.

4. The boom as recited in claim 2, wherein said tongue means comprises two tongue members at opposite ends of its related float, each tongue member having a tongue connecting portion fitting into said groove, and as said end stop means a head portion with a shoulder arranged to engage said float and limit movement thereof along the longitudinal axis.

5. The boom as recited in claim 4, wherein said floats are arranged in pairs, with each pair comprising two floats positioned on opposite sides of said skirt, with adjacent matching tongue members being on opposite sides of said skirt, and a common connector for each matching pair of tongue members, said connector extending through said skirt and engaging its related matching pair of tongue members.

6. The boom as recited in claim 1, wherein said floats are arranged in pairs, with each pair having its two floats on opposite sides of the skirt, each float having slanting surfaces which taper in a narrowing direction from the plane of the skirt, whereby each pair of floats collectively define an oblong tapered configuration.

7. The boom as recited in claim 1, wherein each of said connecting means comprises a pair of spaced tongue members mounted to one of the skirt or related float, and means defining a matching groove mounted to the other of the skirt and the related float.

8. The boom as recited in claim 1, wherein each of said connecting means comprises tongue means mounted to its related float, and matching groove defining means mounted to the skirt and engaging the tongue means so as to permit relative longitudinal movement therebetween.

9. The boom as recited in claim 8, wherein said tongue means comprises upper and lower flanges connected to each float, and said groove defining means comprises upper and lower members connected to said skirt and overlapping said flanges.

10. The boom as recited in claim 9, wherein each of said stop means comprises a stop member connecting its related float to the skirt at a single longitudinal location, so as to permit elongation of the skirt relative to the float.

11. The boom as recited in claim 8, wherein each of said stop means comprises a stop member connecting its related float to the skirt at a single longitudinal location, so as to permit elongation of the skirt relative to the float.

12. The boom as recited in claim 8, wherein the tongue means for each float comprises upper and lower flange members connected to its related float, said groove defining means comprises sets of connecting clips mounted to the skirt at end locations of its related float so as to overlap the flange members of the float, and said stop means comprises a connecting member connecting the related float to the skirt at a single longitudinal location intermediate the clip members.

* * * * *